United States Patent [19]

Würl et al.

[11] Patent Number: 5,714,176
[45] Date of Patent: Feb. 3, 1998

[54] PLASTIC INJECTION MOLDING MACHINE WITH ROTARY AND LINEAR DRIVES

[75] Inventors: Ernst Würl, Höttingen; Helmut Schreiner, Nürnberg, both of Germany

[73] Assignee: Mannesmann Aktiengesellschaft, Düsseldorf, Germany

[21] Appl. No.: 647,858

[22] Filed: May 3, 1996

[30] Foreign Application Priority Data

May 5, 1995 [DE] Germany ............ 195 17 582.4

[51] Int. Cl.⁶ ................................................ B29C 45/82
[52] U.S. Cl. ................................ 425/145; 425/149
[58] Field of Search ........................ 425/145, 135, 425/149, 150

[56] References Cited

U.S. PATENT DOCUMENTS

| | | | |
|---|---|---|---|
| 4,592,712 | 6/1986 | Gutjahr | 425/145 |
| 4,753,588 | 6/1988 | Kiya | 425/145 |
| 4,855,095 | 8/1989 | Sato | 425/145 |

FOREIGN PATENT DOCUMENTS 135876  12/1980  Germany.

*Primary Examiner*—Tim Heitbrink
*Attorney, Agent, or Firm*—Cohen, Pontani, Lieberman & Pavane

[57] ABSTRACT

A plastics injection molding machine having a screw which is arranged in an injection cylinder and is moved by a linear drive and a rotary drive such that it is driven by only one motor. The driving motor is a servo motor and the linear drive is a piston-cylinder unit which is moved by a hydraulic pump which is connected with the driving motor and is in a closed hydraulic circuit. The screw has a drive shaft which is acted upon by the rotary drive connected to the driving motor. The rotary drive has a hydraulic drive with a motor which has a driven motor shaft corresponding to a piston rod. The motor is connected with the forward-flow line via a feed line and an outlet line. A releasable check valve, which is controllable by a two-way directional control valve, is provided in the forward-flow line.

10 Claims, 1 Drawing Sheet

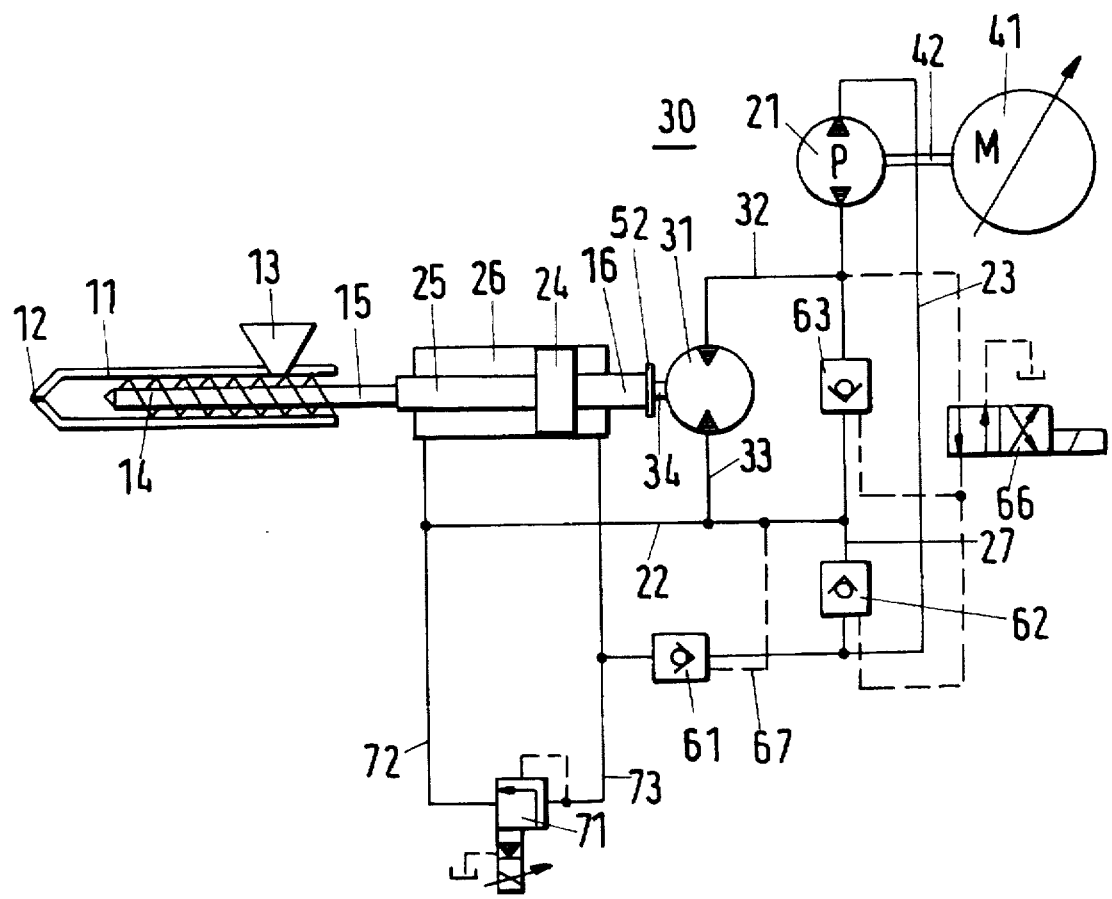

PLASTIC INJECTION MOLDING MACHINE WITH ROTARY AND LINEAR DRIVES

BACKGROUND OF THE INVENTION

1. Field of the Invention

The invention relates to a plastics injection molding machine having a screw which is arranged in an injection cylinder and is moved by a linear drive and a rotary drive such that it is driven by only one motor.

2. Description of the Related Art

DE 39 37 099 discloses a plastics injection molding machine having a shared electric driving motor which rotates the screw during the plasticizing of the plastics granules and which subsequently presses the injection unit in the direction of the discharge opening corresponding to an injection stroke. In the known device, the rotary drive and the injection drive are connected to a driving motor common to both drives via a gear-change box. A coupling which uncouples the pressure pump from the driving motor is provided in the gear unit and is used for carrying out the linear movement after the rotating movement is completed.

A disadvantage of the device is that the gear unit continues to operate in part during the operation of the driving motor. Moreover, the pump which is provided in an open hydraulic circuit can only be driven in one direction.

DE 38 09 792 A1 discloses a process and a device for injection molding relatively thick plastic products. The device has a hydraulic linear drive and a hydraulic rotary drive which are driven in common by an oil pump. A disadvantage of this device is that the rotating movement is carried out by a hydraulic oil motor which is arranged in an open hydraulic system and has only one rotating direction. Furthermore, the hydraulic motor which operates in a rotation-dependent manner is switched off when the screw is reciprocated beyond the predetermined stroke distance.

SUMMARY OF THE INVENTION

Accordingly, it is an object of the present invention to provide a simply designed drive for a plastics injection molding machine by means of which the screw executes the linear and rotating movement and which ensures a quiet and economical operation.

For the purpose of linear and rotational movement, the invention has a shared servo electric driving motor which is coupled with a hydraulic pump at least for the linear movement. The hydraulic pump, in a closed circuit, carries out the linear movement of the screw as a function of the rotating direction. The linear movement of the screw is preferably carried out via a synchronous cylinder. The injection process takes place as a function of the rotating or delivery direction of the pump for the linear operation of the screw. The rotating movement of the screw is effected by a hydraulic drive.

A hydraulic motor which can be disconnected from the driving motor hydraulically during operation is made use of during the hydraulic rotating operation. A mechanical separating coupling is provided to achieve complete disengagement.

In addition to linear driving operation and rotary driving operation, the present invention also enables parallel operation. Further, all movement directions can be adjusted both linearly and rotationally. For this purpose, the closed hydraulic circuit can be operated reversibly. The allocation of function for the injection of the screw on the one had and for the rotation of the screw for delivery on the other hand is given in that the pump can be driven in two rotating directions. However, this can be hydraulically separated, in addition, due to the parallel connection of the two consumers.

A proportional pressure-control valve is provided in the drive for the linear movement of the screw. During hydraulic rotary driving operation, in which a counter-force is required for rotation simultaneously in order to build up the ram pressure in the space preceding the screw, an electronically programmable pressure valve is provided between the two piston surfaces of the synchronous cylinder in order to influence the flowing medium in a pressure-dependent manner.

The hydraulic-hydraulic drive for rotation and for linear movement has a simple design with only a few elements and accordingly can easily be shielded with respect to noise by a simple encapsulation of the unit. Further, this embodiment form makes it possible to encapsulate the unit so as to prevent leakage.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The single FIGURE schematically illustrates a molding machine pursuant to the present invention.

DETAILED DESCRIPTION OF THE PREFERRED EMBODIMENTS

The drawing shows an injection molding machine with an injection cylinder 11 which has a discharge opening 12 for the plasticized plastic and a hopper 13 for introducing plastic pellets to the cylinder. A screw 14 for plasticizing the pellets is arranged in the injection cylinder 11 and is connected to a piston rod 25 which simultaneously serves as a drive shaft 15.

The piston rod 25 is connected with a plunger or piston 24 of a synchronous cylinder 26 for linear operation. The cylinder 26 is connected with a pressure pump or hydraulic pump 21 via hydraulic lines 22, 23 of a closed hydraulic circuit. A switchable check valve 61 is arranged in the line 23 that communicates with the hydraulic space of the linear drive for the feed movement of the screw 14. The lines 22, 23 are connected with one another via a connection line 27 in which a releasable check valve 62 is provided. The piston-cylinder unit 24, 26 is connected with the injection cylinder 11 and the drive shaft 15 by either a yoke or a counter-yoke.

The hydraulic pump 21 is connected, via a drive shaft 42, with a driving motor 41 which is designed as a servo motor.

The cylinder 26 of the linear drive is connected with an electrically programmable proportional pressure-control valve 71 by a forward-flow line 73 and a return-flow line 72.

As can be seen from the drawing, the rotary drive 30 includes a feed line 32 that branches off from the forward flow line 22 to a hydraulic motor 31. An outlet line 33 of the hydraulic motor 31 is connected again with the forward-flow line 22. A releasable check valve 63 which communicates with a control valve 66 is provided in the forward-flow line 22. The hydraulic motor 31 has a driven shaft 34 which communicates, via a coupling 52, with the piston rod 25 as a motor-side drive shaft 16 and thus with the piston 24 of the linear drive. The switchable check valve 61, which opens when triggered, is provided in the hydraulic return line 23 between the cylinder 26 of the linear drive and the hydraulic pump 21. The controllable check valve 62, which closes when triggered, is provided in the connection line 27. The check valve 61 is connected with the forward-flow line 22 by a control line 67.

The check valve 63 is provided in the hydraulic line 22 of the closed hydraulic circuit connecting the hydraulic pump 21 with the cylinder 26 of the linear drive. The check valves 62, 63 are connected with the control valve 66 on the control side. In the closed position of the check valve 63, oil flows through the motor 31. On the output side, there is a relatively low pressure in the outlet line 33 which acts on the control line 67 with the result that the controllable check valve 61 remains closed. If the controllable check valve 63 is opened and the controllable return valve 62 is closed in another working position by means of the control valve 66, a higher pressure builds up in the hydraulic line 22 and in the outlet line 33 and accordingly also in the control line 67 with the result that the controllable valve 61 is opened. In this operating phase, the screw is moved linearly through the piston-cylinder unit 24, 26.

The invention is not limited by the embodiments described above which are presented as examples only but can be modified in various ways within the scope of protection defined by the appended patent claims.

I claim:

1. A plastics injection molding machine, comprising:

an injection cylinder;

a screw movably arranged in the injection cylinder and having a drive shaft;

linear drive means for linearly moving the screw in the injection cylinder, the linear drive means including a piston-cylinder unit, a hydraulic pump for moving a piston of the piston cylinder unit, and a forward-flow line and a return-flow line in fluid connection with the hydraulic pump as a closed hydraulic circuit;

rotary drive means for rotationally moving the screw in the injection cylinder by acting on the drive shaft of the screw, the rotary drive means including a hydraulic motor having a drive shaft that corresponds to a piston rod of the piston-cylinder unit, and a feed line and an outlet line arranged so as to place the forward-flow line of the linear drive means in fluid connection with the hydraulic motor;

a single servo drive motor operatively connected to the linear drive means and the rotary drive means;

a releasable check valve arranged in the forward-flow line; and a two-way directional control valve means for opening and closing the releasable first check valve.

2. An injection molding machine according to claim 1, and further comprising a second check valve provided in the return flow line connecting the cylinder of the linear drive with the hydraulic pump.

3. An injection molding machine according to claim 1, and further comprising a connection line arranged to connect the forward-flow line to the return-flow line, a second check valve being provided in the connection line.

4. An injection molding machine according to claim 2, and further comprising a feed line arranged to directly connect the second check valve to the outlet line.

5. An injection molding machine according to claim 3, and further comprising a feed line arranged to directly connect the second check valve to the outlet line.

6. An injection molding machine according to claim 1, and further comprising a proportional pressure-control valve connected to the cylinder of the linear drive means.

7. An injection molding machine according to claim 1, wherein the piston-cylinder unit of the linear drive means includes at least one synchronous cylinder.

8. An injection molding machine according to claim 7, and further comprising a yoke arranged to connect the piston-cylinder unit with the injection cylinder and the screw drive shaft.

9. An injection molding machine according to claim 7, and further comprising a counter-yoke arranged to connect the piston-cylinder unit with the injection cylinder and the screw drive shaft.

10. An injection molding machine according to claim 1, and further comprising a coupling arranged between the driven motor shaft and the piston rod.

* * * * *